(12) United States Patent
Horvath (10) Patent No.: US 11,229,166 B2
(45) Date of Patent: Jan. 25, 2022

(54) SOIL-COVERING FILM, THE USE OF A SOIL-COVERING FILM TO PROTECT CROPS AGAINST WEEDS, AND A METHOD FOR THE PROTECTION OF CROPS AGAINST WEEDS

(71) Applicant: HOLAGRO KFT., Kecskemet (HU)

(72) Inventor: Laszlo Horvath, Budapest (HU)

(73) Assignee: HOLAGRO KFT., Kecskemet (HU)

( * ) Notice: Subject to any disclaimer, the term of this patent is extended or adjusted under 35 U.S.C. 154(b) by 432 days.

(21) Appl. No.: 16/301,169

(22) PCT Filed: May 10, 2017

(86) PCT No.: PCT/HU2017/050015
§ 371 (c)(1),
(2) Date: Nov. 13, 2018

(87) PCT Pub. No.: WO2017/194982
PCT Pub. Date: Nov. 16, 2017

(65) Prior Publication Data
US 2019/0289795 A1    Sep. 26, 2019

(30) Foreign Application Priority Data

May 11, 2016 (HU) .................................. P1600312

(51) Int. Cl.
*A01G 13/02* (2006.01)
*A01G 9/14* (2006.01)
(Continued)

(52) U.S. Cl.
CPC ....... *A01G 13/0275* (2013.01); *A01G 9/1438* (2013.01); *A01G 13/00* (2013.01);
(Continued)

(58) Field of Classification Search
CPC .............. A01G 13/075; A01G 13/0281; A01G 13/0287; A01G 13/0293; A01G 13/02;
(Continued)

(56) References Cited

U.S. PATENT DOCUMENTS 5,076,008 A * 12/1991 Arroyo ................ G02B 6/4494
47/31
5,226,255 A * 7/1993 Robertson .............. A01G 20/20
47/56
(Continued)

FOREIGN PATENT DOCUMENTS

EP    1116434 A1    7/2001
FR    2312934 A1    12/1976
(Continued)

OTHER PUBLICATIONS

International Search Report for PCT/HU2017/050015 dated Oct. 20, 2017.
(Continued)

*Primary Examiner* — Kristen C Hayes
(74) *Attorney, Agent, or Firm* — Millen, White, Zelano & Branigan, PC; Ryan Pool (57) ABSTRACT

A soil-covering film (10), which contains an air and moisture-permeable sheet, preferably a nonwoven sheet, containing biodegradable and/or compostable fibre (12) and, optionally, binding material (14), where the binding force between the fibres reversibly weakens due to the effect of moisture. The soil-covering film (10) may be used by, for example, laying out the soil-covering film (10) on surface of the soil (40); then the seeds (22) of the crop (20) are placed on the soil-covering film (10); the soil-covering film (10) is kept moist until the seeds (22) located on the surface grow roots (24) and the roots (24) penetrate the soil-covering film (10).

19 Claims, 1 Drawing Sheet

(51) Int. Cl.
*A01N 25/10* (2006.01)
*A01N 25/34* (2006.01)
*A01G 13/00* (2006.01)

(52) U.S. Cl.
CPC ......... *A01G 13/02* (2013.01); *A01G 13/0268* (2013.01); *A01N 25/10* (2013.01); *A01N 25/34* (2013.01)

(58) Field of Classification Search
CPC ............ A01G 13/0206; A01G 13/0212; A01G 13/0225; A01G 20/00; A01G 20/10; A01G 13/0231; A01G 13/0237; A01G 13/0243; A01G 13/0256; A01G 13/0268; A01G 13/0262

See application file for complete search history.

(56) References Cited

U.S. PATENT DOCUMENTS

| | | | | | |
|---|---|---|---|---|---|
| 5,532,298 | A | * | 7/1996 | Monroe | A01G 13/0262 524/13 |
| 5,853,541 | A | * | 12/1998 | Monroe | A01G 13/0262 162/141 |
| 5,866,269 | A | * | 2/1999 | Dalebroux | A01G 13/0275 428/139 |
| 6,029,395 | A | * | 2/2000 | Morgan | C09K 17/52 47/9 |
| 6,407,039 | B1 | * | 6/2002 | Ueda | A01G 13/0268 442/123 |
| 7,059,083 | B2 | * | 6/2006 | Abitz | A01G 20/20 47/56 |
| 8,122,639 | B2 | * | 2/2012 | Kim | A01G 13/0268 47/32.3 |
| 8,383,247 | B2 | * | 2/2013 | Bilodeau | A01G 13/0268 428/532 |
| 10,499,571 | B2 | * | 12/2019 | Kitchen | A01G 13/0287 |
| 10,577,802 | B2 | * | 3/2020 | Wang | A01G 20/20 |
| 10,743,478 | B2 | * | 8/2020 | Tang | D04H 1/587 |
| 2004/0231238 | A1 | | 11/2004 | Baggio et al. | |
| 2006/0207170 | A1 | | 9/2006 | Smith | |

FOREIGN PATENT DOCUMENTS

| | | |
|---|---|---|
| JP | 2008178347 A | 8/2008 |
| WO | 03022029 A1 | 3/2003 |
| WO | 2005004578 A1 | 1/2005 |

OTHER PUBLICATIONS

Alomayri, T. et al., "Effect of water absorption on the mechanical properties of cotton fabric-reinforced geopolymer composites," Journal of Asian Ceramic Societies, 2014, vol. 2, pp. 223-230.
Planting a No-Till Garden, Step-by-Step, Jan. 27, 2015.
English Abstract for JP-20080178347, Publication Date: Aug. 7, 2008.
English Abstract for FR-2312934, Publication Date: Dec. 31, 1976.

\* cited by examiner

SOIL-COVERING FILM, THE USE OF A SOIL-COVERING FILM TO PROTECT CROPS AGAINST WEEDS, AND A METHOD FOR THE PROTECTION OF CROPS AGAINST WEEDS

THE OBJECT OF THE INVENTION

The object of the invention relates to a soil-covering film.

The object of the invention also relates to the use of a soil-covering film to ensure crops are protected against weeds.

The object of the invention also relates to a method for the protection of crops against weeds.

THE STATE OF THE ART

One of the greatest challenges of agricultural and horticultural production is protection against weeds. Weeds are understood as being undesirable plants that grow on arable land in unison with the useful crops (destined for use with the given sowing). More that 6700 different species of weed have been documented, among which, on the global level, approximately 200 are significant in agricultural production. The number of species of weed appearing on active horticultural production sites and plantations drops, but in addition to these the crop plant originating from the previous sowing also appears as a weed. Over the years numerous solutions have been elaborated for weed control, the most widespread forms of protection include the use of sprays (weed killers), mechanised removal (weeding), the use of plastic film soil covers (e.g. black film), gene modification, and removal with physical labour. The aforementioned solutions have various technical, environmental and economic disadvantages. The cost of spray weed killers is significant, and the chemical dispersed in this way raises problems in connection with both the growth and use of the crop to be protected, and the environmental burden represented by such chemicals. Damage to the crop is unavoidable in the case of weed control by machine, which, in many cases, may even cause the crop plants to be killed. Although removal using physical labour is gentler than mechanical weed control, it is time-consuming and expensive. When soil covers (e.g. black film) are used the sprouting weeds do not get sufficient moisture or light, and so die out. The greatest disadvantage of such plastic film is that after it has been used it must be removed and disposed of, which, in numerous cases, also involves an environment-damaging effect, and the black film may, in warmer climates, become overly heated due to its light-absorbing characteristic, and so the crop plants may become burnt/scorched. Recently partially decomposing films have become popular, however, they do not decompose completely, and so may not be used in bio- or organic farming, and their use raises environmental protection concerns. As during their decomposition damaging substances get into the soil or the crops. A further disadvantage of plastic film is that the water dispersed by the irrigation system is badly distributed at a low level of efficiency. The use of gene-modified crops is, on the one hand, extremely costly, and, on the other hand, their use demands a large degree of caution (foreign genes should not get into other plants in the environment, only the weeds of the given area should be killed, etc.). The disadvantages of seedling farming primarily include that direct protection is not provided, only if combined with the use of black film. The method itself is very costly and time-consuming. Soil sterilisation provides effective protection against weeds, but the hot steam used during this process does not only kill the weeds, but also the useful biological elements in the soil. It use is very costly and requires a lot of machinery.

U.S. Pat. No. 5,729,929 A, for example, discloses a band striped plastic film, which ensures various temperatures on the various differently coloured regions. The disadvantage of the solution is that it does not biologically decompose, so, after use, it must be removed from the soil, which is a time-consuming and costly process.

Publication document number WO 2004/080156 discloses a powder mixture that is used on its own or mixed with a liquid as a soil cover. After time the powder sets and becomes solid. The disadvantage of the solution is that its use is very elaborate and it does not behave as a semipermeable layer.

Patent document number KR101347898B B1 discloses a biodegradable mulch with a specific material composition that prevent weeds from growing by blocking out sunlight. The essence of this solution is its biodegradability and the blocking of light, this material is used around the roots of crops, so it can only be used after the crop has sprouted. Its disadvantage is that as it is not a prefabricated sheet, its thickness, i.e. the evenness of the layer may vary while being dispersed and due to later environmental effects (e.g. wind, water). Weeds easily find a way out at thinner places, or places where the cover is missing completely.

Patent publication document number JP2008178347 A discloses a biodegradable cover that prevents weeds from growing, is permeable to water but not to light, and also adheres to the soil. This sheeting is made from a polylactic acid-based polymer. The disadvantage of this solution is that by concentrating on weed covering it does not simultaneously ensure the growth of the crop plants, i.e. it behaves like the black film mentioned above with the difference that it permits moisture to pass through it.

International publication document number WO 03/022029A1 discloses a two-layer seed blanket which contains seeds placed in advance between its layers. Both layers are biodegradable, however the production and storage of the product containing the two layers and the seeds between them is complex (such as the positioning of the seeds between the layers, the fixing of the layers to each other, furthermore, the moisture level must be maintained at a low level during storage and transportation so that the seeds do not germinate before time) and a further disadvantage is that due to the pre-positioned seeds, it is only suitable for the production of the pre-specified crop.

International publication document number WO 2005/004578A1 discloses a sheet serving for covering weeds, which prevents the weeds from developing by blocking out light. The material of the sheet is animal hair and fur. The disadvantage of this is that it concentrates on coving weeds but does not simultaneously ensure the growth of the crops.

The objective of the invention is to provide a soil-covering film that is free of the disadvantages of the solutions according to the state of the art. The objective is especially to create a soil-covering film that is permeable to water, air and preferably light, that does not prevent the crops from growing, and simultaneously prevents the development of weeds around the crops.

The objective of the invention is also the use of such a soil-covering film to provide protection to the crops against weeds.

The objective of the invention is to elaborate an effective and economical method to provide protection to crops against weeds.

BRIEF DESCRIPTION OF THE INVENTION

It was recognised that if a biodegradable and/or compostable and semipermeable soil covering is used that when dry contains a solid fibre network, which network is weakened due to the effect of moisture, then the above objectives may be achieved.

The objective was realised with the help of a soil-covering film that is essentially established as an air and moisture-permeable sheet, preferably nonwoven sheet, containing biodegradable and/or compostable fibres and, optionally, a binding material, and a characteristic of which is that the binding force between the fibres is reversibly weakened due to the effect of moisture.

General reference is made here to the handbook on nonwoven sheets (Nonwoven Fabrics: Raw Materials, Manufacture, Applications, Characteristics, Testing Processes, editor: Wilhelm Albrecht, Hilmar Fuchs, and Walter Kittelmann, ISBN: 978-3-527-60531-6, publisher: Wiley, 2006), which, for example, includes information on, among other things, so-called airlaid or spunlace technology.

Accordingly, the soil-covering film according to the present invention is used so that it is laid out onto the soil and the seeds of the crop to be produced are distributed on it, then a load element is placed on it. Following this the film is moistened and kept moist (e.g. by irrigation), as a result of which the binding forces between the fibres forming the material of the soil-covering film are weakened, and so the fibres easily become displaced as compared to each other. Simultaneously two other processes are started: root development starts from the seeds of the crops, which roots easily penetrate through the weakened fibre network into the soil, and root development from the weed seeds in the soil also starts. Following this, keeping the soil-covering film moist is suspended, and only minimal watering required for the demands of the given crop is continued, therefore the fibre network becomes hard once again. Although by this time the weeds have developed roots in parallel with the crops, the development of their leaves now due occurs only after the fibres of the soil-covering film have become hardened once again. The weeds are unable to grow upwards through the hardened fibre network, and so die out. In parallel with this the crops are free to grow upwards, as their roots have already penetrated through the fibre network.

The soil-covering film according to the invention contains an air and moisture-permeable sheet, preferably a nonwoven sheet, therefore it essentially comprises one or more such sheets.

The material of the biodegradable and/or compostable fibres of the soil-covering film according to the invention is preferable selected from the following group: wood pulp, wood fibre, bamboo, viscose, lyocell, cotton, linen, polyactide, or a mixture thereof. The fibre forming the film according to the invention may comprise, for example, an optionally proportioned mixture of lyocell and viscose, for example in the ratio of approximately 30% lyocell and approximately 70% viscose, or it may consist of only lyocell or only viscose.

The biodegradable and/or compostable binding material optionally used is preferably selected from the following group: corn starch-based paste, potato starch-based paste, dextrin, casein glue, animal glue, polysaccharide, milk solids, glycoside.

The nonwoven sheet has a substantially even thickness, the thickness of which is preferably between 0.2 and 5 mm, and its area density is preferably between 10 and 500 $g/m^2$, even more preferably between 20 and 100 $g/m^2$. The optimal value of the thickness and area density of the film depends on the crop, because if the area density is too large, the film according to the invention would form a too strong network as the fibres would be too close together, so the roots of the crop would be unable to penetrate it even when the film is wet. Also a fibre network that is too weak, i.e. too sparse would not be effective at preventing the growth of weeds. For example, the optimal area density in the case of rocket is 40 $g/m^2$, in the case of baby leaf lettuce 45 $g/m^2$, and in the case of baby leaf spinach 50 $g/m^2$. The determination of the optimal thickness and area density of the film belongs to the common general knowledge of a person skilled in the art.

Optionally the nonwoven sheet is substantially light-transmitting. If the film according to the invention is light-transmitting, this accelerates the growth and therefore dying out of the weeds. It is obvious for a person skilled in the art that transmission of light is not necessary, but it is a preferable characteristic of the film.

Preferably the nonwoven sheet contains at least one type of active component for the purpose of increasing the fertility of the soil, and the at least one type of active component is selected from the group consisting of manure, artificial fertiliser, bio-fertiliser, seaweed, biochar, bone powder, blood meal, coffee grounds, compost, tea compost, coconut fibre, straw, peat, peat moss, moss, vermiculite, sulphur, lime, bio-sludge.

An important technical characteristic of the sheet according to the invention is decomposition time, which is preferably between one week and six months. A film that has started to decompose no longer prevents the development of weeds, therefore it is important that decomposition does not start too soon. The optimum duration of decomposition depends on the raw material of the film, the ambient temperature, humidity, and other climatic conditions. The material of the fibre, the established thickness and area density are preferably selected so that the decomposition time of the soil-covering film is between one week and six months, preferably between two weeks and two months. The determination of the optimal decomposition time belongs to the common general knowledge of a person skilled in the art. It is obvious that a film with a greater area density or with greater thickness made from the same material will decompose more slowly. According to measurements performed, for example, the decomposition time of a film with an area density of 45 $g/m^2$ and a thickness of approximately 1 mm depending on the raw material was the following: a 100% viscose film decomposed in approximately 3 weeks, a 70% viscose and 30% lyocell fibre decomposed in 4 weeks and a 100% lyocell fibre based film decomposed in 6 weeks.

The tensile strength of the film 10 according to the invention when dry is preferably in the range of 1-250 N/5 cm, and when wet it is preferably in the range of 0.5-200 N/5 cm, in both longitudinal and transverse directions. The tensile strength makes reference to how easily the roots of the crop plants penetrate the film according to the invention when wet, and whether it will be strong enough to stop the shoots of the weeds when dry.

The water retention ability of the nonwoven sheet is between 50% and 2000% given in mass percent of the dry material content. The water retention ability is an important characteristic of the film according to the invention because if the water retention ability is too low, the film would have to be watered very frequently in order for it to remain moist for the time until the roots of the crop plants grow through it, and a water retention ability that is too high would mean that it dries out very slowly, and so the weeds would have a better chance of getting through it. Determining the optimal water retention ability depends on the material of the film and the weather, climatic conditions, and belongs to the common general knowledge of a person skilled in the art. Another important technical characteristic of the nonwoven sheet is its liquid absorption time, which is preferably 0.1 to 10 seconds. In the case the liquid absorption time is too long, the film according to the invention would not absorb the water added to make it wet quickly enough, as a consequence of which pools would be created here and there on the surface of the film, which would damage the even distribution of the crop seeds (being washed together or washed off).

The stretching of the nonwoven film according to the invention in the longitudinal or machine direction (MD) and in the transverse or cross direction (CD) is also an important technical parameter. In the case of a stretching value that is too low, the film could easily rip when being spread out, and in the case the material has a stretching value that is too high large spaces could develop between the individual fibres, which reduces the weed growth prevention effect. These values are preferably 5% to 100% in the MD direction and 10% to 200% in the CD direction.

For the duration of manufacture, storage and transportation, the nonwoven sheet can be rolled up into a cylindrical shape, and when used it is spread out substantially flat.

The realisation of the objective is also served by using the soil-covering film according to the invention to ensure crops are protected against weeds.

The realisation of the objective is also served by the method according to the invention—for protecting crops against weeds—during which an air and moisture-permeable, a preferably nonwoven, soil-covering film is provided that contains biodegradable and/or compostable fibres and, optionally, a binding material, characteristic of which is that the binding force between the fibres is reversibly weakened due to the effect of moisture, and:

- the soil-covering film is spread out onto the surface of the soil;
- the crop seeds are placed onto the soil-covering film;
- the soil-covering film is kept moist until the crop seeds located on its surface grow roots and the roots penetrate the soil-covering film;
- following this maintaining the soil-covering film in a continuously moist state is suspended so that the sprouting weeds substantially die out.

Optionally a weight element may be placed on the soil-covering film after or before the seeds are placed on it. The weight element is preferably a covering layer, which layer is substantially free of weed seeds, and formed by e.g. sand, compost, soil or pebbles, or a mixture thereof. The purpose of the use of the weight element is to keep the air and moisture-permeable sheet in position, so the wind, for example, is unable to move it. A further preferable effect of the weight element is that it protects the sown seeds from the damaging effect of the wind and of animals that eat seeds (such as birds). If such damaging effects are not envisaged it is not necessary to use a continuous weight element. In this latter case larger stones, pegs, for example, may be used, a further advantage of which is that the transmission of light is not prevented in the case of the use of a light-transmitting air and moisture-permeable sheet.

During the method according to the invention the soil-covering film is preferably positioned on the surface of the soil using agricultural equipment connected to a tractor. Naturally, positioning may also be performed manually, if appropriate equipment is not available.

The weight element, preferably covering layer, is also placed on the soil-covering film using agricultural equipment connected to a tractor. Manual positioning is possible in this case also.

DETAILED DESCRIPTION OF THE INVENTION

Within the framework of the present description, a crop plant means a plant that is deliberately cultivated during the given sowing during the agricultural activity. A weed is understood to mean all other plants that are not the crop plant, so, for example, crop plants originating from the previous sowing are also understood as being weeds.

Within the framework of the present description moistening is understood as meaning the process when water is dispersed onto the soil, or onto the film according to the invention, or onto the weight element (covering layer) placed onto the film according to the invention in order to ensure the appropriate moisture content. Moisture originating from precipitation, such as rain, may supplement or replace planned moistening. Within the framework of the present description precipitation onto the soil is also viewed as moistening. The water requirement of individual crops, the time when their roots develop and their drought tolerance are known by a person skilled in the art. Therefore in the case of the cultivation of a specific crop with the use of the film according to the present invention calculating how long the film needs to be moistened for in order for the roots to develop and when to suspend the moistening so that the weeds growing in parallel are unable to penetrate the film according to the invention belongs to the common general knowledge of a person skilled in the art. Making corrections for moisture originating from any possible precipitation also belongs to the common general knowledge of a person skilled in the art.

The binding force between the fibres in the soil-covering film according to the invention weakens in a reversible way due to the effect of moisture. This is understood to mean that when the film is dry the binding force between the fibres of the film according to the invention is strong, these binding forces are then weakened due to the effect of moisture, the fibres more easily move over one another, e.g. due to the effect of the roots growing in their vicinity, then after the film dries the binding forces increase again, which strengthens the fibres. In other words the dry/hard-moist/soft states can be transformed into one another by regulating the moisture content.

BRIEF DESCRIPTION OF THE DRAWINGS

The present invention relates to a film, which in the scope of the description is also referred to as a "nonwoven sheet".

Further details of the invention are presented by way of exemplary embodiments, with reference to figures. Wherein.

Figure 1:
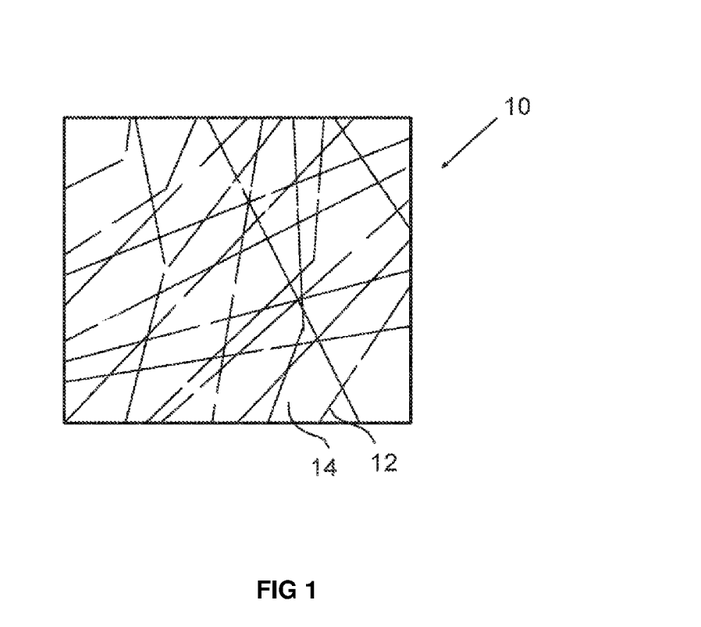
FIG. 1 is a schematic, enlarged picture of a soil-covering film according to the invention.

FIG. 1 depicts a schematic enlarged picture of the soil-covering film 10 according to the invention. The film 10 is an air and moisture-permeable nonwoven sheet containing biodegradable and/or compostable fibres 12, and, optionally, a binding material 14 fixing them to each other. In the context of the present invention a nonwoven sheet is understood to mean a typically artificially produced sheet and/or set of strands containing fibres 12 positioned in a controlled way or randomly, in which the fibres 12 are kept together by mechanical bonding, and/or with a binding material 14 arranged between the fibres 12. Mechanical bonding can be established by, for example, pressing, or with treatment with a controlled, high-pressure water jet (so-called "hydro-entanglement/spunlacing" according to the literature).

Biodegradability is understood to mean the biological degradability of organic compounds, which occurs as a result of the organic compound getting into the environment and its interaction with microorganisms. In other words, biodegrading means the reduction of the complexity of an organic molecule, or its complete degrading into minerals, as is obvious for a person skilled in the art.

Composting is a biological process during which organic substances are transformed into a humus-like material due to the effect of microorganisms, and the activities of other organisms living in the soil.

The fibres 12 preferably contains one or more materials from among the following: wood pulp, wood fibre, bamboo, viscose, lyocell, cotton, linen, polyactide, or a mixture thereof, but naturally the use of other biodegradable and/or compostable materials may be conceived the binding force between the fibres of which weakens in a reversible way due to the effect of moisture.

In the case of a preferable embodiment biodegradable and/or compostable binding material 14 is arranged between the fibres 12 of the film 10 for the purpose of fixing the fibres 12 to each other. Naturally an embodiment may be conceived in which the film 10 contains no binding material 14 at all, as is obvious for a person skilled in the art.

The binding material 14 is preferably selected from the following group: corn starch-based paste, potato starch-based paste, dextrin, casein glue, animal glue, polysaccharide, milk solids, glycoside, but, naturally, other biodegradable and/or compostable material is conceivable that is able to establish a bond between the fibres that weakens due to the effect of moisture.

In the case of a preferred embodiment, the film is flexible planar sheet with substantially even thickness, which thickness is preferably between 0.2 and 5 mm, and its area density is preferably between 10 and 500 g/m$^2$. Before use the film 10 may be preferably stored and transported rolled up.

In the case of an especially preferable embodiment the nonwoven sheet is substantially light transmitting. In the context of the present invention the light transmitting characteristic is understood to mean that the nonwoven sheet at least partially transmits electromagnetic radiation in the infrared and/or ultraviolet and/or visible wavelength range.

The film 10 preferably contains at least one type of active component for the purpose of improving the fertility of the soil 40. In the context of the present invention the concept of soil 40 is understood to mean any soil type suitable for cultivating crops (e.g. chernozem, meadow soil, sandy soil, etc.), as is obvious for a person skilled in the art. The active component may be, for example, artificial fertiliser, bio-fertiliser and similar, as is obvious for a person skilled in the art. The active component may be added to the film 10 preferably when it is produced, or, optionally, following this, in the form of a liquid or a powder, for example.

The soil-covering film 10 according to the invention is used to protect crops 20 against weeds 30. In the following the method according to the invention aimed at protecting crops 20 against weeds 30 and the use of the soil-covering film 10 are disclosed with the help of FIG. 2.

Figure 2:
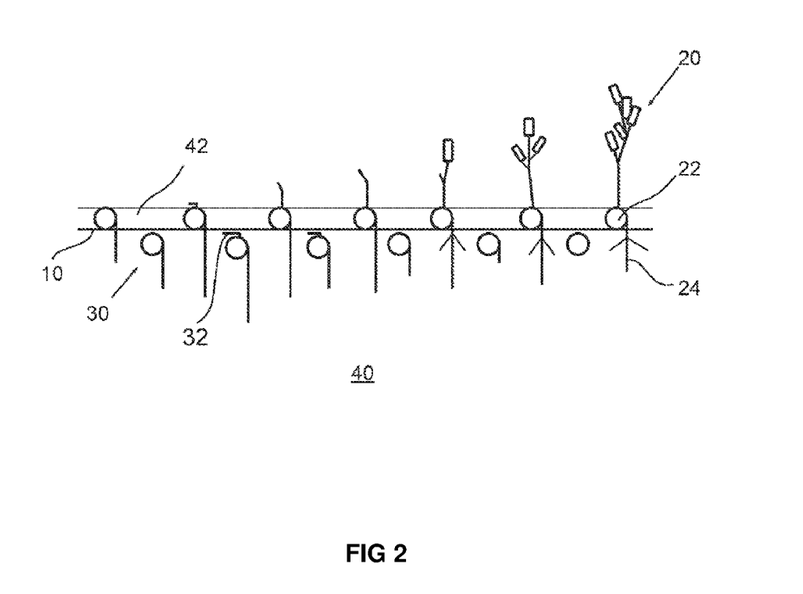
FIG. 2 is a schematic temporal diagram of the use of the soil-covering film according to the invention.

In the course of the method according to the invention an air and moisture-permeable nonwoven soil-covering film 10 is provided that contains fibres 12 from biodegradable and/or compostable, preferably natural or natural-based materials (e.g. wood pulp, wood fibre, bamboo, viscose, lyocell, cotton, linen, polyactide, or a mixture thereof) and, optionally, a binding material 14 from natural or natural-based materials (e.g. corn starch-based paste, potato starch-based paste, dextrin, casein glue, animal glue, polysaccharide, milk solids, glycoside), characteristic of which is that the binding force between the fibres weakens in a reversible way due to the effect of water. The air and moisture permeability of the film 10 may be varied by varying the ratio of the amount of the fibres 12 and of the optional binding material 14 between them. It is obvious for a person skilled in the art that the higher the ratio of the binding material between the fibres, the less the film permits air and moisture to pass through itself. As a result of the air and moisture permeability of the film 10, it preferably permits the active components of manure, artificial fertiliser as well as the water originating from irrigation (moistening) to pass through it.

In the first step of the method according to the invention the soil-covering film 10 is laid out on surface of the soil 40. In the case of an especially preferable embodiment the film 10 is a planar sheet rolled up into the shape of a cylinder, the thickness of which film 10 is preferably between 0.2 and 5 mm, and its area density is between 10 and 500 g/m$^2$. The laying out of the film 10 may take place manually, or preferably using a tractor, or using other agricultural equipment that may be connected to another vehicle.

In the second step of the method according to the invention the seeds 22 of the crop 20 are placed on the laid out soil-covering film 10. The placing of the seeds 22 may take place manually (hand sowing), or using agricultural equipment (mechanical sowing).

In the case of an especially preferable embodiment, after or previous to placing the seeds 22 a weight element 42, preferably a covering layer is placed on the soil-covering film 10. The weight element 42 may be a covering layer comprising, for example, sand, compost, soil, pebbles or a mixture thereof, which covering layer is substantially free of weed seeds. Optionally, an embodiment is conceivable in which first of all the weight element 42 is placed on the film 10, then the seeds 22 are placed on the top of or within the covering layer forming the weight element 42. The primary function of the weight element 42 is to act as a weight and fix the film 10 laid out on the soil 40 in its position, and, if it is a covering layer, then the seeds 22 as well, and to protect the film 10 and the seeds 22 from the vicissitudes of the weather (e.g. wind) and from being consumed by animals (primarily birds).

In the third step of the method according to the invention the film 10 and the seeds 22 are moistened. The moistening may take place continuously or intermittently. The moistening is performed until the seeds 22 start to develop roots 24, and the roots 24 penetrate the soil-covering film 10. The duration of further moistening, or its intensity (the amount of water used) may be different depending on the type of crop, as is known to a person skilled in the art. The moistening may preferably take place using traditional irrigation equipment already installed on the land, such as a rotary irrigation system, wheel line irrigation system, etc. Natural precipitation may also be calculated in the moistening according to the third step.

When dry the film 10 does not permit roots 24 to penetrate. On the effect of moisture the bonds between the fibres 12 of the film 10 are weakened to such an extent that the roots 24 are now able to penetrate through them and get into the soil 40 under the film 10.

When in dry state the film 10 substantially does not let the shoots 32 of the weeds 30 under the film 10 through and when wet it lets them through to only a negligible extent, due to this the film 10 provides a semipermeable layer between the soil 40 and the seeds 22 of the crop 20. In other words the semipermeable nature of the film 10 in the context of the present invention means that the film 10 makes it possible for the roots 24 of the seeds 22 growing roots to get downwards into the soil 40, but substantially prevents the shoots 32 of the weeds 30 in the soil 40 under the film 10 getting to the surface, as illustrated by FIG. 2. What stands in the background of this is, on the one part, that when in their natural medium the roots of plants make a path in the soil downwards, however, their shoots growing upwards do not normally come up against any obstacles. Therefore, when using the film 10 according to the present invention, the roots 24 of the crop 20 penetrate through the fibrous material of the film 10, however, the shoots of the weeds growing upwards get stuck in the material of the film 10 and so the weed dies. This phenomenon is confirmed by the recognition according to the present invention that the phenomenon of plant seeds, on the effect of moisture, first growing roots and only growing shoots a few days later may be exploited. So this phenomenon may be exploited by using the film 10 according to the present invention so that the bonds between the fibres in the film 10 moistened during the method become loosened, due to this they can be easily penetrated by the roots 24 of the crop 20 that have started to develop due to the effect of moisture, simultaneously the weed seeds under the film 10 also naturally grow roots. Depending on the species of crop the moistening of the film 10 is suspended after approximately 6 to 10 days, due to which the film 10 dries out, and the bonds between the fibres 12 get stronger. By this time the roots of the crop have already penetrated the film 10, in other words this no longer represents any obstacle to the development of the crop. Then the upward growing shoots start to develop, both from the crop 20 and the weeds 30. Because they are under the film 10, the shoots 32 of the weeds 30 get stuck in the dry, hard film 10 and the weed 30 dies within a few days. However, there is no obstacle to the crop 20 growing, even if the weight element 42 is formed by a covering layer (e.g. thin layer of sand). Suspension of moistening in the context of the present invention does not necessarily mean the complete withdrawal of moisture. Depending on the species of crop cultivated, after the moistening has been suspended it may be necessary to make up for the lack of moisture every few days with supplementary moistening (supplementary irrigation) to a lesser or larger extent in the interest of the freshly grown crop getting sufficient moisture for growth. This supplementary moistening must be of an extent so that the binding force between the fibres 12 of the film 10 does not significantly weaken, or if it does happen it must be for just a short amount of time. An average person skilled in the art should be able to theoretically and empirically determine the amount of supplementary moistening required for individual crops. In general it can be said that initially in order to implement the method according to the invention it is worthwhile keeping the sown seeds continuously moistened for a period of 6 to 10 days, preferably by irrigation 2 to 4 mm per day. Following this the supplementary moisturing should be performed every 2 to 4 days.

FIG. 2 depicts a flow diagram presenting the development of the crop 20, on which diagram time is shown on the horizontal axis.

Therefore, by implementing the method detailed above the film 10 prevents weeds 30 growing in the sowing. The film 10 is air and moisture-permeable, therefore the conditions required for the subsurface processes of the growth of the crop are ensured, and due to its optional light transmitting characteristic it does obstruct the growth of the crop 20.

As a consequence of these characteristics, the film 10 lets through the active substances of the manure, the artificial fertiliser and the water originating from irrigation, in this way, during the cultivation of the crop 20, the usual agricultural operations can be easily performed in the traditional manner.

A further function of the film 10 is that it provides protection for the crop 20 as a physical boundary layer against the pests found in the soil (e.g. insects, vermin), so they—at least until the film according to the invention decomposes—cannot get at the stems, shoots and leaves of the crop 20.

A further advantage of the film 10 according to the invention is that as it contains biodegradable and/or compostable fibres 12 and, optionally, a binding material 14, after or previous to the harvesting phase there is no need to remove and dispose of the film 10, as after a time the film 10 decomposes on its own as a consequence of the environmental effects in such a way that harmful substances are not produced during the decomposing process. The duration of the decomposition of the film 10 and the semipermeable ability may be regulated with the thickness of the film 10, the amount of optional binding material 14 and with the appropriate selection of the fibres 12 and binding material 14. For example a thicker film decomposes more slowly than a film of the same composition yet thinner.

In the case of a preferably embodiment the material of the fibre 12 and the binding material 14 are selected so that their decomposition time is between 2 weeks and 6 months, through which the cultivation cycle time of the various types of crop 20 may be adapted to, i.e. the time from sowing until harvest. As is obvious for a person skilled in the art, the cultivation cycles depend on several circumstances, such as, for example, the climate and the intensity of irrigation, and, to give examples, these cycle times fall into the following ranges: baby leaf spinach 18-24 days, rocket 28-40 days, corn salad 28-40 days, and carrot 3-4 months.

Optionally, at least one type of active component is provided in the soil-covering film 10 for the purpose of improving the fertility of the soil 40. As the film 10 decomposes the active component in the film 10 gets into the soil 40. The active component may be, for example, artificial fertiliser, bio-fertiliser or a mixture thereof. Apart from those listed, naturally other materials suitable for improving the fertility of the soil 40 are conceivable, as is known by a person skilled in the art.

Preferably the active component is put into the film 10 already when it is manufactured, for example, in such a way that during manufacture the active component is added in addition to the fibres 12 and the binding material 14, if any. Optionally, the active component may be added to the film 10 after manufacture, in such a way, for example, that the film 10 is dipped into a liquid containing the active component, and then the film 10 is dried.

The advantage of the film 10 and method according to the invention is that it provides sustainability and may be used in both traditional and organic farming. It replaces the seedling cultivation system and black film as the currently generally used soil covering. In addition to the essence of the present invention detailed above, it has numerous advantages over black film, for example, it may be a soil improver and biofertiliser at the same time, and sunlight does not overheat it. Its use in agriculture is both technically and economically simple. The environmental impacts of the method according to the invention provide a huge advantage as compared to competing technologies, such as, for example, genetic modification (GM), seedling cultivation, agricultural sprays, soil sterilisation, crop covers, soil covers and seed blankets. The implementation of the method is simple in any existing cultivation system, and does not require high-value investment.

The use of the film 10 may increase the number of produce sown and harvested in one year on a given area of soil 40. As according to the state of the art the duration between the harvest and the next sowing of crops is usually 2 to 4 weeks depending on the crop, during this period the weeds sprout, grow and are then burnt. By using the film according to the invention, this period can be omitted, in other words there can be as many as four to five harvests in a season on given area of land as opposed to the present two to three harvests.

The effectiveness of the film 10 according to the invention has also been confirmed by tests performed on open farmland. During the experiments six different types of nonwoven sheet forming the film 10 according to the present invention were examined on a total of seven seedbeds, the seventh seedbed was left empty as a control. The nonwoven sheets used on the individual seedbeds were of the following types:

Type 1: A nonwoven sheet made using airlaid technology, the fibre 12 of which is wood pulp (75%), and its binding material 14 ethylene vinyl acetate (25%). It must be noted here that although ethylene vinyl acetate is not a biodegradable binding material, however, it is suitable for the purpose of the comparison tests presented here.

Type 2: A nonwoven sheet made using airlaid technology, the fibre 12 of which is wood pulp (73%), and its binding material 14 (23%) potato starch-based paste.

Type 3: A nonwoven sheet made using so-called spunlace technology, the fibre 12 of which is viscose, and which does not contain binding material 14.

prevent the wind blowing away the sheets. Following this a covering layer (sand layer) was spread out as a weight element 42 on the top of the seedbeds to a thickness of 0.5 to 1 cm using a sand spreading device attached to a tractor, and seeds 22 of seven different crops were sown into all of them. A specific type of seed 22 was sown in lines in a single seedbed for a length of five metres, in this way seven sections were established over a length of thirty-five metres. The last five-metre section was a control area, where nothing was sown. The seeds 22 used and the sowing densities were the following:

1. rocket—2000 seeds/$m^2$
2. chard—1200 seeds/$m^2$
3. carrot—1000 seeds/$m^2$
4. baby leaf lettuce—1500 seeds/$m^2$
5. baby leaf spinach—1200 seeds/$m^2$
6. leaf beet—1200 seeds/$m^2$
7. corn salad—1800 seeds/$m^2$
8. the last 5 m without crop The sowing was followed by a light rolling, which compacted the upper part of the seedbeds, and covered the sown seeds 22 with sand, in this way maximising the contact between the tested nonwoven sheet and the soil.

Following this the tested growing area was covered with a produce cover, the use of which improved the microclimate, and kept more moisture on top of the soil, through which better conditions were ensured for the germination period.

The seedbeds were moistened on a daily basis for the first eight days, then every 2 to 4 days for the remaining part of the experiment (moisture replacement). During the four weeks of the experiment the temperature varied between 18-27 Celsius degrees, the weather was almost completely without precipitation.

In this experiment the produce cover was removed after the eighth day and the results were assessed. The following table contains the percentage proportion of the germination "GE" of the seeds 22 (the penetration of the roots) and the obstruction "OB" of the weeds (non-penetration of the weed shoots) on the eighth day:

|   | rocket | | chard | | carrot | | lettuce | | spinach | | leaf beet | | corn salad | | empty |
|---|---|---|---|---|---|---|---|---|---|---|---|---|---|---|---|
|   | GE | OB | GE | OB | GE | OB | GE | OB | GE | OB | GE | OB | GE | OB | OB |
| 1. | 80 | 80 | 85 | 80 | 80 | 80 | 80 | 80 | 80 | 80 | 85 | 80 | 80 | 80 | 80 |
| 2. | 85 | 85 | 90 | 85 | 85 | 85 | 85 | 85 | 85 | 85 | 90 | 85 | 85 | 85 | 85 |
| 3. | 95 | 100 | 95 | 100 | 95 | 100 | 95 | 100 | 95 | 100 | 95 | 100 | 95 | 100 | 100 |
| 4. | 90 | 100 | 90 | 100 | 90 | 100 | 90 | 100 | 90 | 100 | 90 | 100 | 90 | 100 | 100 |
| 5. | 50 | 60 | 50 | 60 | 50 | 60 | 50 | 60 | 50 | 60 | 50 | 60 | 50 | 60 | 60 |
| 6. | 80 | 60 | 85 | 60 | 80 | 60 | 80 | 60 | 80 | 60 | 85 | 60 | 80 | 60 | 60 |
| 7. | 100 | 0 | 100 | 0 | 100 | 0 | 100 | 0 | 100 | 0 | 100 | 0 | 100 | 0 | 0 |

Type 4: A nonwoven sheet made using a combination of airlaid and spunlace technologies, the fibre 12 of which is wood pulp and viscose, and which does not contain binding material 14.

Type 5: Three-layer paper, which has low breaking strength (12.4 N/5 cm) when wet.

Type 6: Five-layer paper, which has no breaking strength when wet.

Type 7: Control area, which did not contain a nonwoven sheet.

During the experiments the nonwoven sheets forming the film 10 according to the invention were manually laid out on the individual seedbeds for a length of about 40 metres, and their edges were weighed down with stones in order to The test area was analysed a further three times after periods of one week. After the second week following the start of the experiment the three-layer and five-layer paper had completely decomposed, while after four weeks had passed the other nonwoven sheets had also decomposed. With the start of the decomposition of the nonwoven sheets, their ability to obstruct the weeds dropped, then disappeared. The experiment showed that the obstruction of the weeds was the longest in the cases of nonwoven sheets type 3 and 4.

In summary, the environmental, social, economic and technical advantages of the method according to the invention are the following:

it terminates or reduces the need for the use of agricultural sprays and chemicals;

it reduces the use of agricultural vehicles ($CO_2$ emissions);
it reduces the size of the (rented) area used for production;
it increases the safety of foodstuffs;
it ensures sustainable production;
it is free of genetic modification (GM);
it reduces the costs of labour and cultivation;
it permits organic farming at the cost of traditional cultivation;
it provides protection against weeds, pathogens and pests;
it may be used in organic farming;
it permits irrigation water and fertiliser to pass through it;
it decomposes, therefore it is not necessary to remove and dispose of it;
it prevents weeds growing for a period of 2 weeks to 6 months;
it provides uniform production in various irrigation systems (water cannons, boom, sprayer heads, drip irrigation systems);
it is useable with directly sown seed and with seedlings;
it directly replaces black film as soil-cover;
it permits direct, simple and single-step open-field use;
it ensures diversity of use—open field, polytunnel, greenhouse;
it increases the number of planted and harvested produce on the annual level;
it may be used for any plant species;
the cultivation produces unwashed but clean leaves;
it reduces the environmental impacts of farming.

Alternative solutions to the embodiments presented here will be apparent to a person skilled in the art without departing from the scope of protection determined by the claims.

The invention claimed is:

1. Soil-covering film (10) comprising:
an air and moisture-permeable sheet, containing biodegradable and/or compostable fibre (12) and, optionally, binding material (14), wherein the binding force between the fibres of the air and moisture-permeable sheet reversibly weakens due to the effect of moisture,
wherein the air and moisture-permeable sheet is essentially a planar sheet with substantially even thickness, and wherein the thickness is between 0.2 and 5 mm,
wherein the air and moisture-permeable sheet has an area density of between 10 and 500 $g/m^2$,
wherein the air and moisture-permeable sheet has a tensile strength in the range of 1-250N/5 cm when dry and 0.5-200 N/5 cm when wet, in both longitudinal and transverse directions,
wherein the air and moisture-permeable sheet has a water retention ability of between 50% and 2000% given in mass percent of the dry material content, and
wherein the air and moisture-permeable sheet has the ability to stretch from 5%-100% in the longitudinal direction and 10%-200% in the transverse direction.

2. The soil-covering film (10) of claim 1, wherein the material of the biodegradable and/or compostable fibres (12) is selected from the group consisting of wood pulp, wood fibre, bamboo, viscose, lyocell, cotton, linen, polyactide, and a mixture thereof.

3. The soil-covering film (10) of claim 1, wherein the air and moisture-permeable sheet is substantially light-transmitting.

4. The soil-covering film (10) of claim 1, wherein the material of the fibre (12) and the optional binding material (14) are selected so that the soil-covering film (10) has a decomposition time of between one week and six months.

5. The soil-covering film (10) of claim 1 wherein the area density of the air and moisture-permeable sheet is between 20 and 100 $g/m^2$.

6. The soil-covering film (10) of claim 1 wherein the decomposition time of the soil-covering film (10) is between two weeks and two months.

7. The soil-covering film (10) of claim 1 wherein the air and moisture-permeable sheet, is a nonwoven sheet.

8. A method for protecting crops (20) against weeds (30), wherein a soil-covering film (10), which contains an air and moisture-permeable sheet, containing biodegradable and/or compostable fibres (12) and, optionally, binding material (14) is provided, where the binding force between the fibres reversibly weakens on the effect of moisture, the method comprising:
laying out the soil-covering film (10) on a surface of the soil (40);
placing seeds (22) of the crop (20) on the soil-covering film (10);
keeping moist the soil-covering film (10) until seeds (22) located on the surface grow roots (24) and the roots (24) penetrate the soil-covering film (10);
suspending the action of keeping the soil-covering film (10) continuously moist, and
wherein the thickness of the air and moisture-permeable sheet is between 0.2 and 5 mm,
wherein the air and moisture-permeable sheet has an area density of between 10 and 500 $g/m^2$,
wherein the air and moisture-permeable sheet has a tensile strength in the range of 1-250 N/5 cm when dry and 0.5-200 N/5 cm when wet, in both longitudinal and transverse directions.

9. The method of claim 8, wherein a weight element (42) is placed on the soil-covering film (10) after or before the seeds (22) have been positioned.

10. The method of claim 9, wherein the weight element (42) is a covering layer.

11. The method of claim 9, wherein the weight element (42) is placed on the soil-covering film (10) using a device connected to a tractor.

12. The method of claim 8, wherein the soil-covering film (10) is laid out on the surface of the soil (40) using an agricultural device attached to a tractor.

13. The method of claim 8, wherein the material of the biodegradable and/or compostable fibres (10) is selected from the group consisting of wood pulp, wood fibre, bamboo, viscose, lyocell, cotton, linen, polyactide, and a mixture thereof.

14. The method of claim 8, wherein the air and moisture-permeable sheet is substantially light transmitting.

15. The method of claim 8 wherein the material of the fibre (12) and the optional binding material (14) is selected so that the soil-covering film (10) has a decomposition time of between one week and six months.

16. The method of claim 8, wherein the air and moisture-permeable sheet has a water retention ability of between 50% and 2000% given in mass percent of the dry material content, and the air and moisture-permeable sheet has the ability to stretch from 5%-100% in the longitudinal direction and from 10%-200% in the transverse direction.

17. The method of claim 8, wherein the area density of the air and moisture-permeable sheet is between 20 and 100 $g/m^2$.

18. The soil-covering film (10) of claim 8 wherein the decomposition time of the soil-covering film (10) is between two weeks and two months.

19. A soil-covering film (10), comprising:

an air and moisture-permeable sheet, containing biodegradable and/or compostable fibre (12) and, optionally, binding material (14), wherein the binding force between the fibres of the air and moisture-permeable sheet reversibly weakens due to the effect of moisture, and wherein the air and moisture-permeable sheet has a tensile strength in the range of 1-250 N/5 cm when dry and 0.5-200 N/5 cm when wet, in both longitudinal and transverse directions.

* * * * *